United States Patent
Jain et al.

(10) Patent No.: US 10,331,844 B2
(45) Date of Patent: Jun. 25, 2019

(54) METHODS OF TUNING CURRENT RATIO IN A CURRENT MIRROR FOR TRANSISTORS FORMED WITH THE SAME FEOL LAYOUT AND A MODIFIED BEOL LAYOUT

(71) Applicant: GLOBALFOUNDRIES Inc., Grand Cayman (KY)

(72) Inventors: Vibhor Jain, Essex Junction, VT (US); James W. Adkisson, Jericho, VT (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 162 days.

(21) Appl. No.: 15/290,569

(22) Filed: Oct. 11, 2016

(65) Prior Publication Data
US 2018/0102289 A1 Apr. 12, 2018

(51) Int. Cl.
*G06F 17/50* (2006.01)
*H01L 27/082* (2006.01)
*H01L 21/8222* (2006.01)
*H01L 21/027* (2006.01)

(52) U.S. Cl.
CPC ...... *G06F 17/5081* (2013.01); *G06F 17/5063* (2013.01); *G06F 17/5068* (2013.01); *H01L 27/082* (2013.01); *H01L 27/0823* (2013.01); *G06F 2217/12* (2013.01); *H01L 21/0274* (2013.01); *H01L 21/8222* (2013.01)

(58) Field of Classification Search
CPC ............. G06F 17/5081; G06F 17/5068; G06F 2217/12
See application file for complete search history.

(56) References Cited

U.S. PATENT DOCUMENTS

| 8,020,128 B2 | 9/2011 | Joseph et al. | |
| 2009/0007051 A1* | 1/2009 | Chou | G06F 17/5068 716/50 |
| 2015/0007122 A1* | 1/2015 | Chen | H01L 27/0207 716/112 |
| 2015/0140478 A1* | 5/2015 | Chen | G03F 1/36 430/5 |

(Continued)

OTHER PUBLICATIONS

Canderle et al., "Impact of BEOL Stress on BiCMOS9MW HBTs", 2013 IEEE Bipolar/BiCMOS Circuits and Technology Meeting.

(Continued)

*Primary Examiner* — Michael Jung
(74) *Attorney, Agent, or Firm* — Thompson Hine LLP; Anthony Canale (57) ABSTRACT

Methods for designing and fabricating a current mirror. A first layout is received for a first back-end-of-line (BEOL) stack that is coupled with an emitter of a bipolar junction transistor in a current mirror that has a first current ratio. A second layout for a second back-end-of-line (BEOL) stack, which differs from the first BEOL stack, is determined such that, when the second BEOL stack is coupled with the emitter of the bipolar junction transistor, the first current ratio is changed to a second current ratio. The change from the first current ratio to the second current ratio, which is based on the change from the first layout for the first BEOL stack to the second layout for the second BEOL stack, is accomplished without changing a front-end-of-line (FEOL) layout of the bipolar junction transistor.

17 Claims, 7 Drawing Sheets

(56) References Cited

U.S. PATENT DOCUMENTS

| | | | |
|---|---|---|---|
| 2015/0143319 A1* | 5/2015 | Lee | G06F 17/5068 |
| | | | 716/118 |
| 2016/0034631 A1* | 2/2016 | Wang | G06F 17/5081 |
| | | | 716/113 |
| 2016/0070842 A1* | 3/2016 | Barowski | G06F 17/5077 |
| | | | 716/130 |
| 2016/0163685 A1 | 6/2016 | Jain et al. | |
| 2017/0140086 A1* | 5/2017 | Sio | G06F 17/5072 |

OTHER PUBLICATIONS

Rucker et al., "Impact of Back End Stress on SiGe Bipolar Transistors", copyright 2011 IEEE.

Tseng et al., "A 3-V monolithic SiGe HBT power amplifier for dual-mode (CDMA/AMPS) cellular handset applications" IEEE Journal of Solid-State Circuits, vol. 35, No. 9, Sep. 2000.

Jaeger et al., "Microelectronic Circuit Design" Chapter 16, Analog Integrated Circuit Design Techniques, Fourth Edition, copyright 2011 The McGraw-Hill Companies, Inc.

\* cited by examiner

METHODS OF TUNING CURRENT RATIO IN A CURRENT MIRROR FOR TRANSISTORS FORMED WITH THE SAME FEOL LAYOUT AND A MODIFIED BEOL LAYOUT

BACKGROUND

The invention relates generally to integrated circuit fabrication and semiconductor devices and, in particular, to methods for designing and fabricating a current mirror.

A current mirror may be used as a current source in a wide range of electronic circuits, such as power amplifiers. In a common configuration, a reference current source supplied a constant reference current to a reference bipolar junction transistor, which passes the reference current at the same level as the reference current source to a mirrored current source. The mirrored current source includes one or more additional mirrored bipolar junction transistors that also pass current from an external power supply, but with reference to the reference current from the reference transistor. Consequently, the reference current source is used to control the output of the mirrored current source.

A bipolar junction transistor is a three-terminal electronic device that includes an emitter, an intrinsic base, and a collector defined by regions of different semiconductor materials. In the device structure, the intrinsic base is situated between the emitter and collector. An NPN bipolar junction transistor may include n-type semiconductor material regions constituting the emitter and collector, and a region of p-type semiconductor material constituting the intrinsic base. A PNP bipolar junction transistor includes p-type semiconductor material regions constituting the emitter and collector, and a region of n-type semiconductor material constituting the intrinsic base. In operation, the base-emitter junction is forward biased, the base-collector junction is reverse biased, and the collector-emitter current may be controlled by the base-emitter voltage.

A heterojunction bipolar transistor is a variant of a bipolar junction transistor in which at least two of the collector, emitter, and intrinsic base are constituted by semiconductor materials with different energy bandgaps, which creates heterojunctions. For example, the collector and/or emitter of a heterojunction bipolar transistor may be constituted by silicon, and the base of a heterojunction bipolar transistor may be constituted by silicon germanium (SiGe), which is characterized by a narrower band gap than silicon.

Improved methods are needed for designing and fabricating a current mirror.

SUMMARY

In an embodiment of the invention, a method is provided that includes receiving, at one or more processors, a first layout for a first back-end-of-line (BEOL) stack that is coupled with an emitter of a bipolar junction transistor in a current mirror that has a first current ratio. The method further includes determining, by the one or more processors, a second layout for a second back-end-of-line (BEOL) stack that differs from the first BEOL stack such that, when the second BEOL stack is coupled with the emitter of the bipolar junction transistor, the first current ratio is changed to a second current ratio. The change from the first current ratio to the second current ratio, which is based on the change from the first layout for the first BEOL stack to the second layout for the second BEOL stack, is accomplished without changing a front-end-of-line (FEOL) layout of the bipolar junction transistor.

BRIEF DESCRIPTION OF THE SEVERAL VIEWS OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

DETAILED DESCRIPTION

Figure 1:
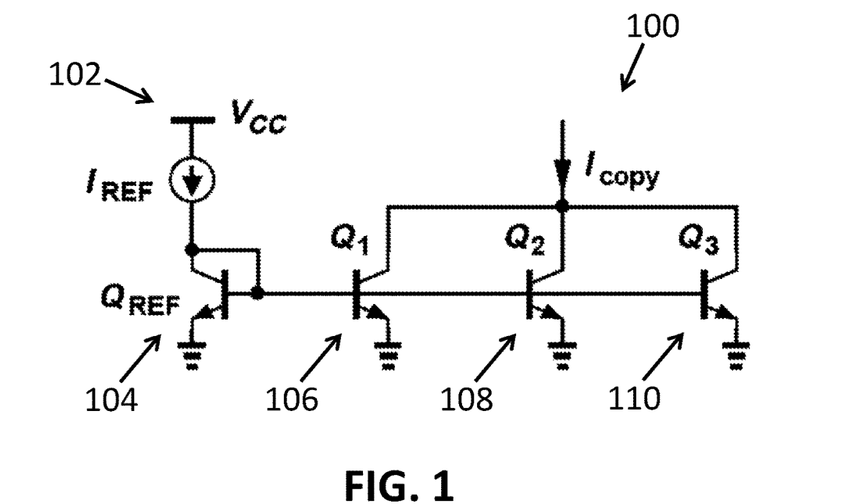
FIG. 1 is a schematic view of an electrical circuit for a current mirror in accordance with embodiments of the invention.

With reference to FIG. 1 and in accordance with embodiments of the invention, a current mirror 100 includes a reference current source 102 that generates a reference current at a predetermined reference level and a reference bipolar junction transistor 104. The reference current source 102 generates a voltage at the base-emitter junction of the reference bipolar junction transistor 104 ($Q_{REF}$) and the collector current of the reference bipolar junction transistor 104 is taken as the reference current. A plurality of mirrored bipolar junction transistors 106, 108, 110 ($Q_1$, $Q_2$, $Q_3$) are coupled with the reference bipolar junction transistor 104 and collectively operate as a mirrored current source. The output of the mirrored current source, namely the mirrored current ($I_{copy}$), is controlled by the reference current and is a multiple of the reference current. A different number of mirrored bipolar junction transistors may be present in the current mirror 100 than in the representative embodiment that includes a trio of mirrored bipolar junction transistors 106, 108, 110.

The mirrored bipolar junction transistors 106, 108, 110 of the mirrored current source pass the mirrored current from an external power supply (not shown), but with reference to the reference current arriving from the collector of the reference bipolar junction transistor 104. The current ratio between the mirrored current and the reference current, at a given voltage between the base and emitter (Vbe), depends, among other factors, upon a ratio of the collective emitter area of the mirrored bipolar junction transistors 106, 108, 110 to the emitter area of the reference bipolar junction transistor 104. The emitter area is equal to the area of the emitter-base junction and, for that reason, is evaluated at the location of the emitter-base junction and depends on the dimensions and number of emitter fingers.

Each of the bipolar junction transistors 104, 106, 108, 110 is coupled with a back-end-of-line (BEOL) stack and, in particular, the emitter of each of the bipolar junction transistors 104, 106, 108, 110 is coupled with a back-end-of-line (BEOL) stack. For purposes of simplification of description, the BEOL stack may be considered to include contacts and wiring formed during middle-of-line (MOL) processing so as to encompass structures fabricated following the conclusion of front-end-of-line (FEOL) processing. The BEOL stacks coupled with the different bipolar junction transistors 104, 106, 108, 110 and coupling the different bipolar junction transistors 104, 106, 108, 110 with each other to form the circuitry of the current mirror 100 are diagrammatically represented by the connecting line segments. For example, the bipolar junction transistors 104, 106, 108, 110 in the current mirror 100 are NPN transistors in which their respective emitters are coupled by wires in the BEOL stack with ground.

The bipolar junction transistors 104, 106, 108, 110 are current-controlled transistors that allow for current amplification. Ideally, the current ratio of the current mirror 100 is equal to a ratio of the emitter area of the bipolar junction transistors 106, 108, 110 to the emitter area of the bipolar junction transistor 104 (i.e., the emitter area ratio). However, local sources of stress, including but not limited to stress transferred to the respective transistor device regions from BEOL stack and stress transferred from the shallow trench isolation to each active device region, may operate to alter the current ratio of the current mirror 100. For that reason, the mirrored current produced by the current mirror 100 may be modulated through the selection of the configuration of the BEOL stack, which can be used to select the stress applied to the bipolar junction transistors 104, 106, 108, 110.

To achieve a targeted current ratio in relation to a reference current ratio, the configuration of the BEOL stack may be adjusted for one or more of the bipolar junction transistors 104, 106, 108, 110 without changing the FEOL layout. For example, the bipolar junction transistors 106, 108, 110 may have the same FEOL layout, but each may have a different BEOL stack in order to achieve a targeted current ratio. The value of the collector current changes for those of the bipolar junction transistors 104, 106, 108, 110 that are subject to the adjustment to its BEOL stack, which in turn changes the current ratio of the current mirror. In an embodiment, the adjustment to the BEOL stack may involve a change of the layout to either introduce or remove the metallization (e.g., wire) in a wiring level overlying the first wiring layer. The layout change may alter the wireout of the associated bipolar junction transistors in the circuitry of the current mirror 100.

The adjustment to the configuration of the BEOL stack may be performed without any change to the FEOL layout of the bipolar junction transistors 104, 106, 108, 110. Among the parameters for the FEOL layout is the configuration of the emitter (e.g., emitter area, number of emitter fingers). In other words, the FEOL layout of the bipolar junction transistors 104, 106, 108, 110 is fixed, and the current ratio may be tuned by adjusting only the configuration of the BEOL stack for one or more of the bipolar junction transistors 104, 106, 108, 110. The FEOL processing and the layout for the photomasks used in FEOL processing may be consider as a first portion of integrated circuit fabrication including transistor fabrication, and may generally cover all transistor fabrication steps up to, but not including, the formation of the contacts, vias, and wiring by MOL and BEOL processing.

A benefit of such an adjustment scheme is that the FEOL masks and design layouts for the bipolar junction transistors 104, 106, 108, 110 do not have to be changed in order to adjust the current ratio; instead, the less expensive BEOL masks can be modified to tune the current ratio. In addition, electronic fuses are not needed as added device structures in order to tune the current ratio of the current mirror. The flexibility in adjusting the current ratio may be beneficial in an instance in which an initial value of current ratio is predicted for a current mirror circuit, but deviates from the predicted initial value when the circuit is manufactured.

The change in stress resulting from the adjustment to the configuration of the BEOL stack to one or more of the bipolar junction transistors 104, 106, 108, 110 can be used to increase or decrease the value of the current ratio. For example, the value of the current ratio may be increased from an initial value in a first instance to a new value in a subsequent instance that is greater than the initial value but closer to the ideal current ratio, increased from the initial value to a new value that is equal to the ideal current ratio, or increased from the initial value to a new value that is greater than the ideal current ratio. As another example, the value of the current ratio may be reduced or decreased from an initial value in a first instance to a new value in a subsequent instance that is less than the initial value but farther from the ideal current ratio, from the initial value to a new value that is equal to the ideal current ratio, or from the initial value to a new value that small than the initial value but greater than the ideal current ratio.

Figure 2:
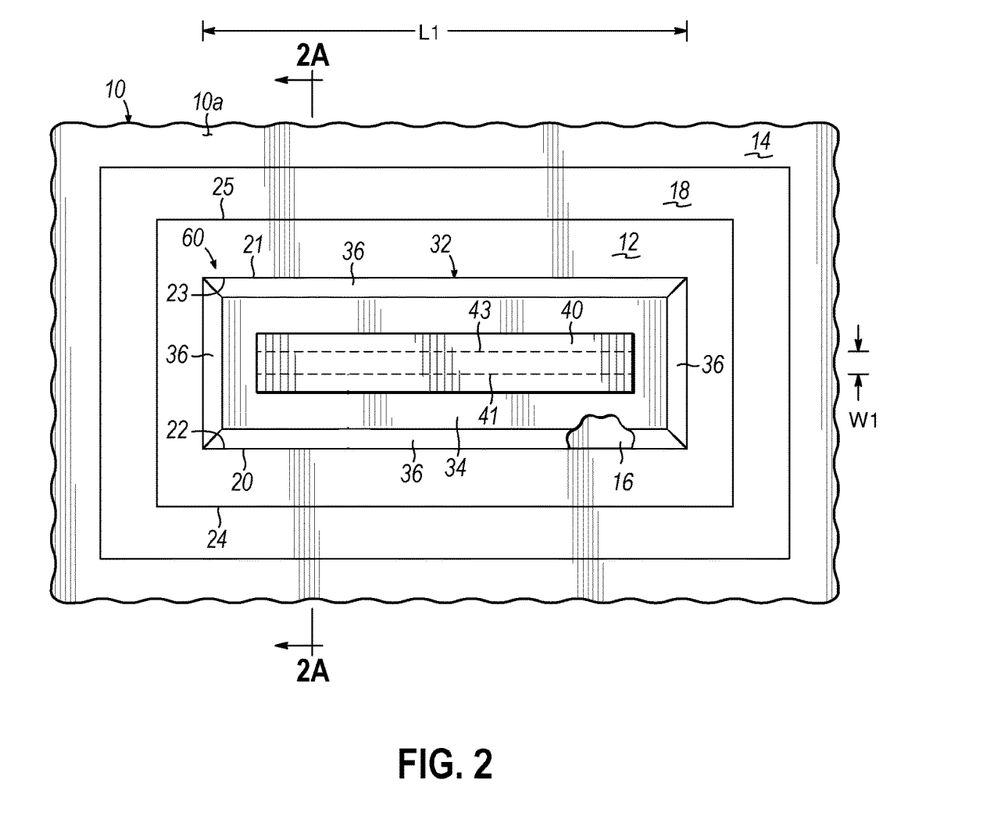
FIG. 2 is a top view of a bipolar junction transistor of the current mirror and in accordance with embodiments of the invention.
Figure 2A:
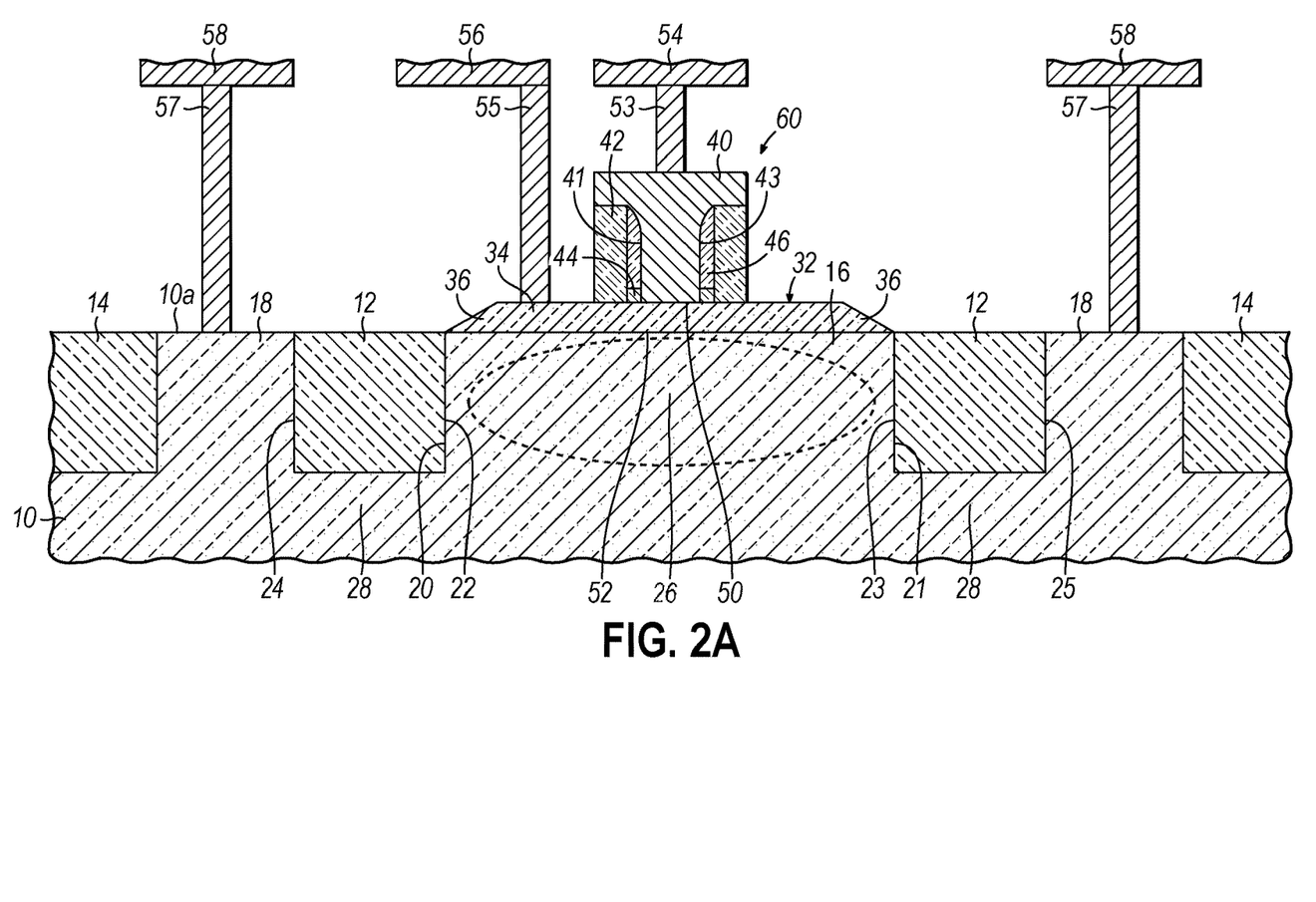
FIG. 2A is a cross-sectional view taken generally along line 2A-2A in FIG. 2, and in which the metallization of an interconnect structure for the bipolar junction transistor is added.
Figure 2B:
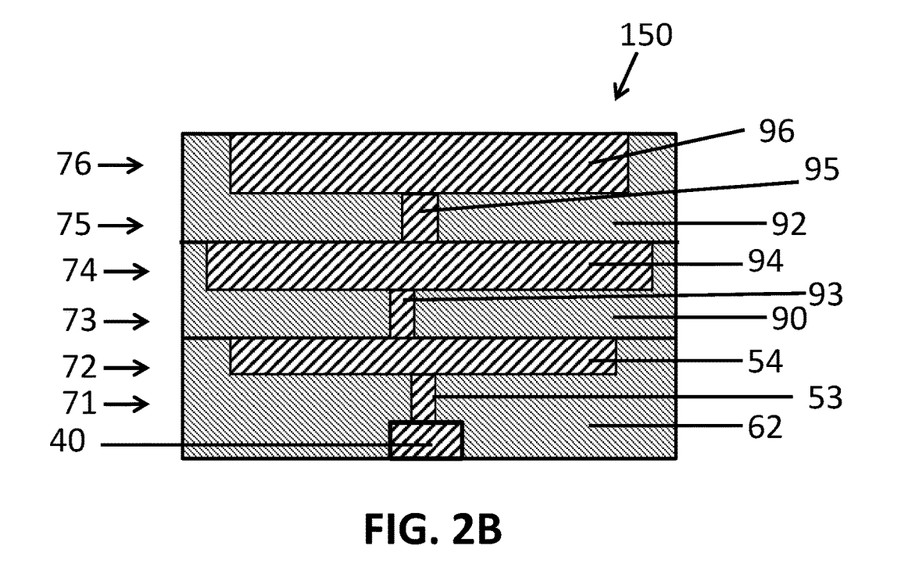
FIG. 2B is a diagrammatic cross-sectional view of the interconnect structure of FIG. 2A in which the different wiring levels coupled with the emitter are visible.

With reference to FIGS. 2, 2A, 2B and in accordance with embodiments of the invention, a bipolar junction transistor 60 may be formed using a substrate 10, which may be a wafer constituted by a single-crystal semiconductor material compatible with the device fabrication by FEOL processes. The semiconductor material constituting the substrate 10 may include an epitaxial layer at its surface, and the epitaxial layer may be doped with an electrically-active dopant to alter its electrical conductivity.

Trench isolation regions 12, 14 are formed in the semiconductor material of the substrate 10. The trench isolation regions 12, 14 may be formed by a shallow trench isolation (STI) technique. Trenches are formed that extend from a top surface 10a of the substrate 10 to a given depth into the substrate 10, and are filled with an electrical insulator by depositing a layer of the electrical insulator to fill the trenches and then planarizing with, for example, chemical mechanical polishing (CMP). The trench isolation regions 12, 14 may be comprised of a dielectric material, such as an oxide of silicon (e.g., silicon dioxide ($SiO_2$)) deposited by CVD.

The trench isolation regions 12, 14 define the bounds of, and furnish electrical isolation for, an active device region 16 and a collector contact region 18, which are each comprised of the semiconductor material of the substrate 10. The collector contact region 18 is positioned adjacent to the active device region 16 and is separated from the active device region 16 by the trench isolation regions 12. The trench isolation regions 12 are arranged to surround the active device region 16 at its sidewalls 20, 21, and the trench isolation regions 14 are arranged to surround the collector contact region 18, the trench isolation regions 12, and the active device region 16.

The positions and arrangement of the trench isolation regions 12 define the size, geometrical shape, and outer perimeter of the active device region 16. The positions and arrangement of the trench isolation regions 14 relative to the trench isolation regions 12 define the size, geometrical shape, inner perimeter, and outer perimeter of the collector contact region 18. In particular, the active device region 16 is located between inner or interior sidewalls 22, 23 of the trench isolation regions 14 and the collector contact region 18 is located between outer or exterior sidewalls 24, 25 of the trench isolation regions 14 and trench isolation regions 12.

A collector 26 of a bipolar junction transistor 60 is located in the active device region 16 between its exterior sidewalls 20, 21 and may constitute all or only a portion of the active device region 16. The electrical conductivity of the collector 26 may be elevated by, for example, an ion implantation of an electrically-active dopant into the semiconductor material of the active device region 16. A subcollector 28 may extend laterally at a depth in the substrate 10 that is located beneath the trench isolation regions 12 in order to couple the collector 26 with the collector contact region 18.

A base layer 32 is formed as a layer of a given thickness on a top surface of the active device region 16. The base layer 32 may include a single crystal section 34 positioned in vertical alignment with the active device region 16 and that directly contacts the single crystal semiconductor material of the active device region 16. The base layer 32 may further include facets 36 that terminate at a position nominally coinciding with the position of the edge of the active device region 16 proximate to the exterior sidewalls 20, 21 and that surround the single crystal section 34. The base layer 32 may be comprised of a layer of a semiconductor material, such as silicon-germanium (SiGe) including silicon (Si) and germanium (Ge) in an alloy with the silicon content ranging from 95 atomic percent to 50 atomic percent and the germanium content ranging from 5 atomic percent to 50 atomic percent. The germanium content of the base layer 32 may be uniform or the germanium content of base layer 32 may be graded and/or stepped across the thickness of base layer 32. The base layer 32 may be doped with a concentration of a dopant, such as an impurity species from Group III of the Periodic Table (e.g., boron (B) or phosphorus (P)) effective to impart p-type conductivity.

The base layer 32 may be formed using a low temperature epitaxial (LTE) growth process, such as vapor phase epitaxy (VPE) conducted at a growth temperature ranging from 400° C. to 850° C. Single crystal semiconductor material (e.g., single crystal SiGe) epitaxially grows in the single crystal section 34, which is disposed on the active device region 16. The crystal structure of the single crystal semiconductor material of the active device region 16 serves as a crystalline template for the growth of the crystal structure of the single crystal section 34 of the base layer 32. The facets 36 of the base layer 32 may comprise a mixture of polycrystalline and single crystal semiconductor material. The layer forming the base layer 32 may include a field region peripheral to the facets 36. The base layer 32 may be divided into an intrinsic base that participates in the emitter-base junction and another portion that participates in forming an extrinsic base used to contact the intrinsic base.

An emitter 40 is located in an emitter opening that extends through a section of a dielectric layer 42 and a pad layer 44 beneath the dielectric layer 42. The emitter 40, which is constituted by a single emitter finger, is electrically and physically coupled with a top surface of the base layer 32. The dielectric layer 42 and the pad layer 44 may be comprised of an electrical insulator, such as silicon nitride ($Si_3N_4$) or silicon dioxide ($SiO_2$) deposited using CVD. The dielectric layer 42 and pad layer 44 are patterned using photolithography and etching processes to define the emitter opening, which is aligned with the single crystal section 34 of the base layer 32. The base layer 32 is located vertically between the emitter 40 and the collector 26.

The emitter 40 may be formed from a layer of semiconductor material that is deposited and then itself patterned using lithography and etching processes. The emitter 40 may be comprised of a heavily-doped semiconductor material that is deposited and then patterned using lithography and etching processes. For example, the emitter 40 may be comprised of polysilicon or polycrystalline silicon-germanium deposited by CVD or LPCVD and heavily doped with a concentration of a dopant, such as an impurities species from Group V of the Periodic Table, such as phosphorus (P) or arsenic (As), effective to impart n-type conductivity. The lithography process may utilize photoresist and photolithography to form an etch mask that protects only a strip of the semiconductor material registered in position with the emitter opening. The dielectric layer 42 may also be lithographically patterned using one or more etch masks and etching processes, such as RIE, with a suitable etch chemistry. In addition, the patterning may unbury the collector contact region 18 by removing the overlying layer stack.

The emitter 40 is characterized by a width, W1, between its exterior sidewalls 41, 43 and a length, L1, in a direction orthogonal to its width. The emitter area of the emitter 40 is given by the area (i.e., the product of length and width) of each emitter finger multiplied by the number of emitter fingers. The emitter area defines an area for the emitter-base junction. As discussed herein, the current ratio of a current mirror is related to a ratio of the emitter areas of reference and mirrored bipolar junction transistors, which may be constructed similar to bipolar junction transistor 80, in the current mirror.

Non-conductive spacers 46 clad the emitter opening and are formed before the emitter 40 is formed. The non-conductive spacers 46 may be formed by depositing a conformal layer comprised of an electrical insulator, such as silicon nitride ($Si_3N_4$) deposited by CVD, and shaping the conformal layer with an anisotropic etching process, such as RIE, that removes the electrical insulator preferentially from horizontal surfaces. The emitter 40 includes exterior sidewalls 41, 43 that are adjacent to and coextensive with the non-conductive spacers 46, and that are separated by the width, W1.

The bipolar junction transistor 60 features a vertical architecture in which the collector 26 in the active device region 16, and the base layer 32 (i.e., the single crystal section 34), the emitter 40 are vertically arranged. The conductivity type of the semiconductor material constituting the base layer 32 is opposite to the conductivity type of the semiconductor materials constituting the emitter 40 and the collector 26. The bipolar junction transistor 60 may be characterized as a heterojunction bipolar transistor (HBT) if two or all three of the collector 26, the base layer 32, and the emitter 40 are comprised of different semiconductor materials.

An emitter-base junction 50 is defined at the interface between the emitter 40 and the base layer 32. The area of the emitter base junction, which is directly related to the dimensions of the emitter 40, determines the emitter area for the bipolar junction transistor 60. A base-collector junction 52 is defined at the interface between the collector 26 and the base layer 32. The bipolar junction transistor 60 can be divided into an intrinsic device region coinciding with the portions of the collector 26, the emitter 40, and the base layer 32 participating in the junctions 50, 52, and an extrinsic device region outside of the intrinsic device region.

The trench isolation regions 12 transfer stress to the active device region 16, which influences the collector current of the bipolar junction transistor 60. Generally, the stress from the trench isolation regions 12 is larger for device structures of the bipolar junction transistor 60 with a single emitter finger than a device structure with multiple emitter fingers.

During the FEOL of the fabrication process, the device structure of the bipolar junction transistor 60 may replicated across at least a portion of the surface area of the substrate 10. For example, each of the bipolar junction transistors 104, 106, 108, 110 in the current mirror 100 (FIG. 1) may have the FEOL construction shown for the bipolar junction transistor 60.

Following FEOL processing, middle-of-line (MOL) and back-end-of-line (BEOL) processing is used to form a BEOL stack 150 that operates as an interconnect structure for FEOL devices. The BEOL stack 150 includes contacts and wiring for the local interconnect structure overlying the bipolar junction transistor 60, and dielectric layers, vias, and wiring for wiring and via levels of the BEOL stack 150 coupled with the local interconnect structure. Each of the bipolar junction transistors 104, 106, 108, 110 may have its own specific and unique layout for its BEOL stack 150, as described hereinbelow and as needed for tuning the current ratio for the current mirror 100.

The BEOL stack 150 includes a local interconnect level having a wiring level 72 and a contact level 71, and further includes wiring levels 74, 76 and via levels 73, 75 formed above the local interconnect level, as shown in FIGS. 2A, 2B. The number of wiring levels and via levels may depend on the design requirements of the integrated circuit. The different wiring levels may be formed using different design rules, such as the dimensions for the wiring.

Contacts 53, 55, 57 and wires 54, 56, 58 may be formed with respective arrangements in a dielectric layer 62 (FIG. 2B) as, respectively, the contact level 71 and the first wiring level 72 of the BEOL stack 150 and are arranged and dimensioned in accordance with a representative interconnect layout. Each set of one or more contacts 53, 55, 57 may comprise an array of conductor-filled vias that are arranged with a given pitch. Alternatively, each set of one or more contacts 53, 55, 57 may comprise a bar via that may be larger than size than the vias of an array. The one or more contacts 53 couple the wire 54 with the emitter 40, the one or more contacts 55 couple the wire 56 with a portion of the base layer 32 that is outside of the footprint of the emitter 40 and the intrinsic device region, and the one or more contacts 57 couple the wire 58 with the collector contact region 18.

The contacts 53, 55, 57 may be comprised of a conductive material, such as tungsten (W), deposited in contact openings defined in the dielectric layer by photolithography and etching processes. The wires 54, 56, 58 may be comprised of a conductive material, such as copper (Cu), and may be formed by a damascene process or layer patterning with reactive ion etching (RIE). The dielectric layer 62 may be comprised of silicon dioxide ($SiO_2$), silicon nitride ($Si_3N_4$), and combinations of these and other dielectric materials.

The wiring levels 72, 74, 76 are located generally above the emitter 40 and intrinsic device region of the bipolar junction transistor 60. The wiring level 74, which may be considered to be a second wiring level (M2), may include a wire 94 that is coupled by a via 93 in the via level 73 with the wire 54 in wiring level 72. The wiring level 76, which may be considered to be a third wiring level (M3), may include a wire 96 that is coupled by one or more vias 95 in the via level 75 with the wire 94 in the wiring level 74. The one or more vias 93 in the via level 73 and the wire 94 in the wiring level 74 may be arranged in a dielectric layer 90. Similarly, one or more vias 95 in the via level 75 and the wire 96 in the wiring level 76 may be arranged in a dielectric layer 92. As a result of the wiring layout, the emitter 40 of the bipolar junction transistor 60 is wired out in the wiring level 76 to, for example, ground in a current mirror.

The vias 93, 95 and wires 94, 96 may be comprised of an electrical conductor, such as copper (Cu), aluminum (Al), or a copper alloy, and may be formed by a damascene process. The dielectric layers 90, 92 may be comprised of silicon dioxide ($SiO_2$), silicon nitride ($Si_3N_4$), and combinations of these and other dielectric materials.

Collectively, the wiring levels 72, 74, 76 transfer a given stress to the emitter 40 and the intrinsic device region of the bipolar junction transistor 60, which is a factor in determining the values of the current gain and collector current at a given DC base-emitter bias of the bipolar junction transistor 60. The transferred stress may be altered by altering the configuration of the wiring levels 72, 74, 76, such as removing one of the wiring levels 72, 74, 76 from the BEOL stack 150 or adding another wiring level to the BEOL stack 150.

In an alternative embodiment, the vias 93 in the via level 73 may be omitted such that the wire 54 in wiring level 72 is not coupled by in the via level 73 with the wiring level 74 and the emitter 40 may be wired out instead at wiring level 72. As a consequence, the wiring levels 74, 76 contain dummy metallization that is present to generate stress that is transferred to the emitter 40 and the intrinsic device region of the bipolar junction transistor 60.

Figure 3A:
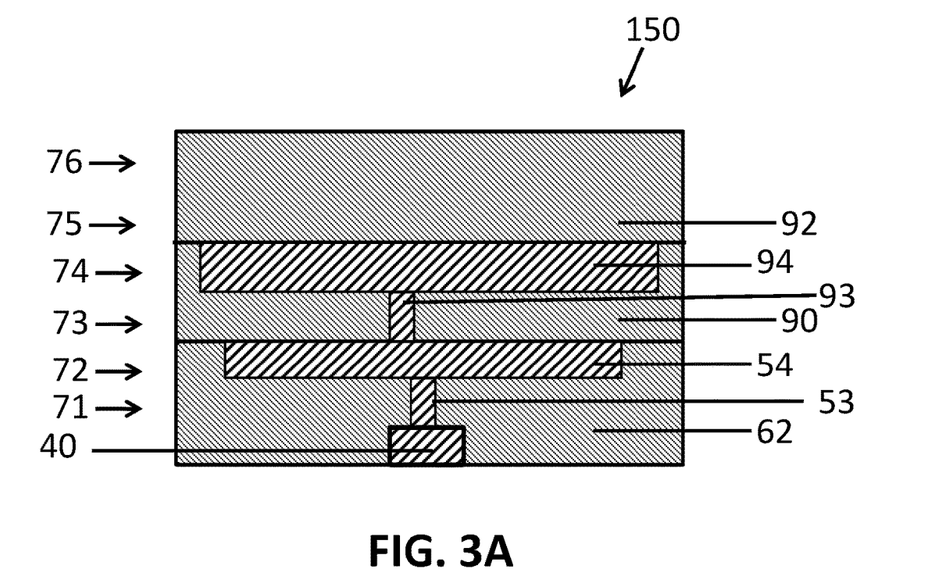
FIG. 3A is a cross-sectional view similar to FIG. 2B in which the interconnect structure for the emitter of the bipolar junction transistor is modified to reduce the number of wiring levels.

With reference to FIG. 3A in which like reference numerals refer to like features in FIG. 2B, the wire 96 may be removed from the uppermost wiring level 76 such that the wiring level 76 is free of metallization in a region generally above the emitter 40 and intrinsic device region of the bipolar junction transistor 60. In this arrangement, the emitter 40 may be wired out in the wiring level 74 or, alternatively, may be wired out in wiring level 72 with the wiring level 74 being a dummy wiring level. The stress that is transferred to the emitter 40 of the bipolar junction transistor 60 and generally to the intrinsic device region of the bipolar junction transistor 60 is less than the stress transferred when metallization is present in wiring level 76.

Figure 3B:
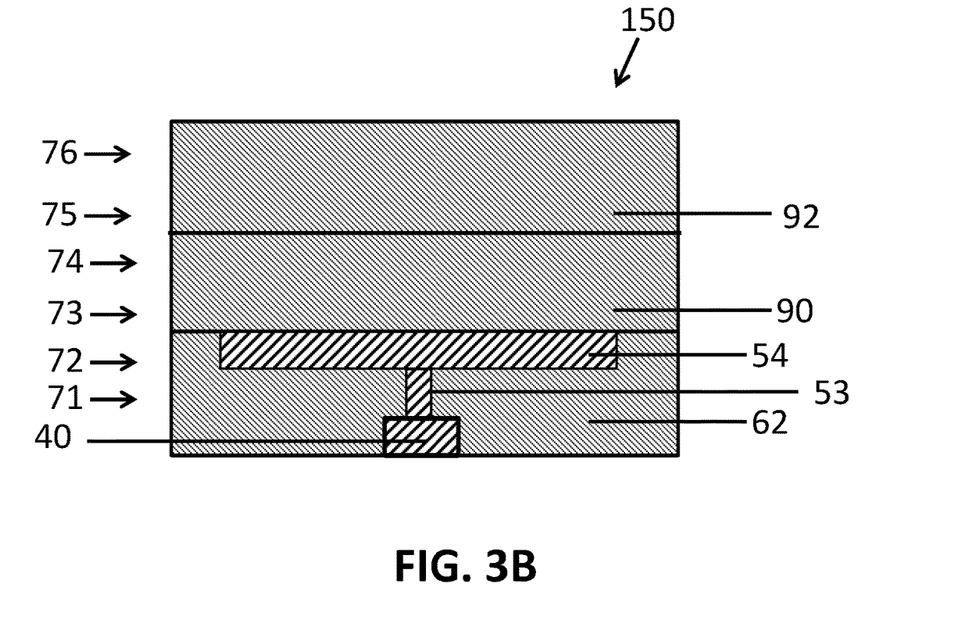
FIG. 3B is a cross-sectional view similar to FIG. 3A in which the interconnect structure of the interconnect structure for the bipolar junction transistor is modified to further reduce the number of wiring levels.

With reference to FIG. 3B in which like reference numerals refer to like features in FIG. 3A, the wires 94, 96 may be removed from the wiring levels 74, 76 such that the wiring levels 74, 76 are free of metallization in a region generally above the emitter 40 and intrinsic device region of the bipolar junction transistor 60. In this arrangement, the emitter 40 may be wired out in the wiring level 72. The stress that is transferred to the emitter 40 of the bipolar junction transistor 60 and generally to the intrinsic device region of the bipolar junction transistor 60 is less than the stress transferred when metallization is present in wiring level 74 and/or wiring level 76.

The bipolar junction transistor 60 can be characterized by various performance metrics. One of those performance metrics is the common-emitter current gain or beta ($\beta$), which represents an amplification factor for the base current. The current gain may be determined based upon a ratio of the collector current (i.e., output current) to base current (i.e., input current). The different stresses introduced by the different arrangements of wiring in the BEOL stack may cause a change in the current gain. This permits the current gain for the bipolar junction transistor 60 to be tuned by changing the BEOL stack and without otherwise disturbing the FEOL device layout. Similarly, an adjustment to the current gain of one or more of the bipolar junction transistors 104, 106, 108, 110 in the current mirror 100 (FIG. 1) may be effective to cause a change to its collector current and thereby a change in the current ratio for the current mirror 100.

Figure 4:
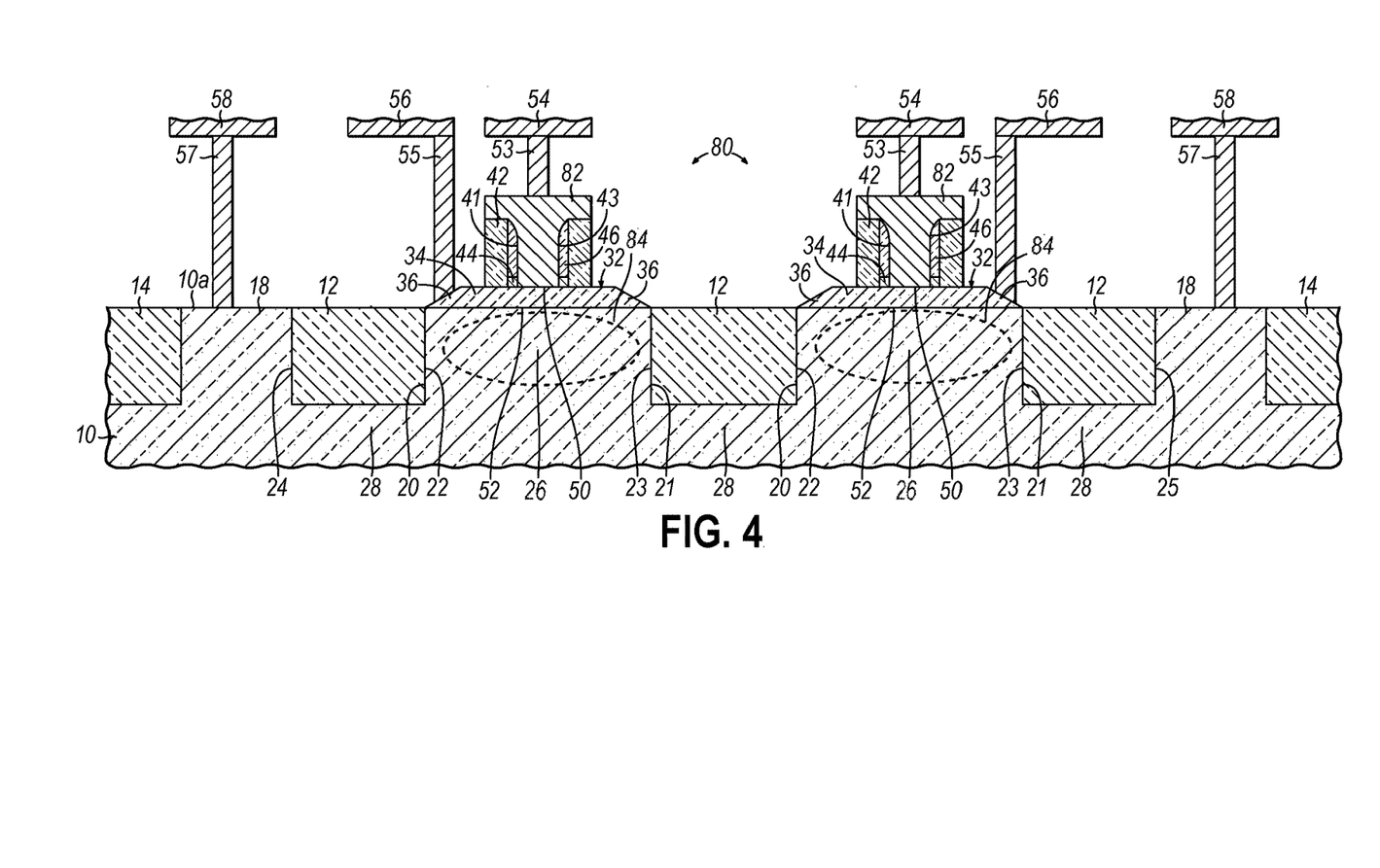
FIG. 4 is a cross-sectional view of a bipolar junction transistor of the current mirror in accordance with embodiments of the invention.

With reference to FIG. 4 in which like reference numerals refer to like features in FIGS. 2, 2A, a bipolar junction transistor 80 may be characterized by multiple emitter fingers 82 in comparison with the single-finger emitter 40 of the bipolar junction transistor 60 (FIGS. 2, 2A). The number of emitter fingers 82 may vary according to the device design, and each emitter finger 82 may have a construction similar to emitter 40 and each may have its own associated device region 84. The emitter fingers 82 each contact the base layer 32 on its device region 84 and form a constituent part of the emitter-base junction of the bipolar junction transistor 80, and the emitter fingers 82 collectively constitute the emitter of the device structure. Each of the bipolar junction transistors 104, 106, 108, 110 in the current mirror 100 (FIG. 1) may have a FEOL layout with multiple emitter fingers 82 as shown for the bipolar junction transistor 80.

Similar to emitter 40, each of the emitter fingers 82 is characterized by a width, W1, between its respective exterior sidewalls 41, 43 and a length, L1, in a direction orthogonal to its width. The total emitter area of the emitter fingers 82 is given by the area (i.e., the product of length and width) of each emitter finger 82 multiplied by the number of emitter fingers 82. As discussed herein, the current ratio of a current mirror is related to a ratio of the emitter areas of reference and mirrored bipolar junction transistors, which may be constructed similar to bipolar junction transistor 80, in the current mirror.

Figure 5:
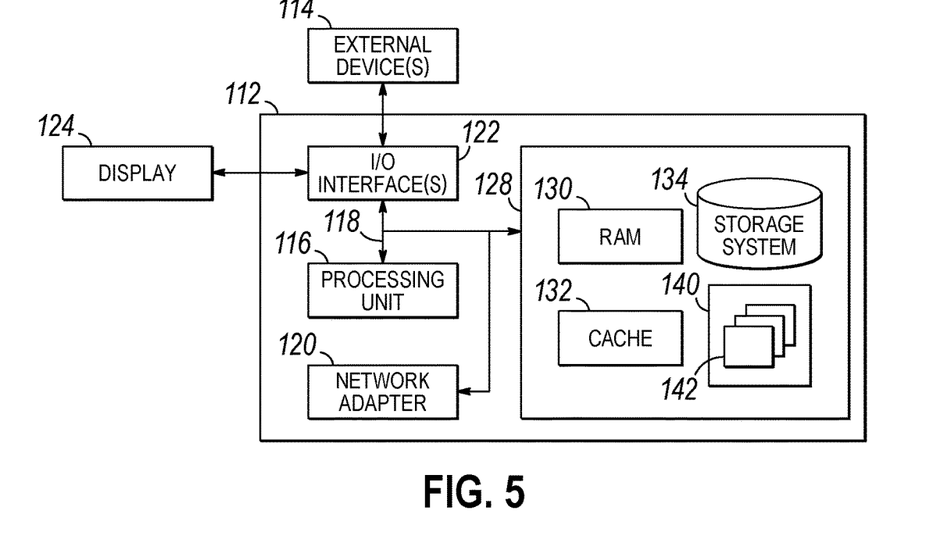
FIG. 5 is a diagrammatic view of an exemplary computer system configured to determine an interconnect structure layout for a bipolar junction transistor to tune the current ratio of a current mirror.

With reference to FIG. 5, a schematic of an exemplary computer system 112 is shown. The computer system 112 may include one or more processors or processing units 116, a system memory 128, and a bus 118 that couples various system components including system memory 128 to each processing unit 116. Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 112 typically includes a variety of computer system readable media. Such media may be any available media that is accessible by computer system 112, and it includes both volatile and non-volatile media, removable and non-removable media.

System memory 128 can include computer system readable media in the form of volatile memory, such as random access memory (RAM) 130 and/or cache memory 132. Computer system 112 may further include other removable/non-removable, volatile/non-volatile computer system storage media. By way of example only, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 118 by one or more data media interfaces. As will be further depicted and described below, system memory 128 may include at least one program product having a set (e.g., at least one) of program modules that are configured to carry out the functions of embodiments of the invention.

Program/utility 140, having a set (at least one) of program modules 142, may be stored in system memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of embodiments of the invention as described herein.

Computer system 112 may also communicate with one or more external devices 114 such as a keyboard, a pointing device, a display 124, etc.; one or more devices that enable a user to interact with computer system 112; and/or any devices (e.g., network card, modem, etc.) that enable computer system 112 to communicate with one or more other computing devices. Such communication can occur via Input/Output (I/O) interfaces 122. Still yet, computer system 112 can communicate with one or more networks such as a local area network (LAN), a general wide area network (WAN), and/or a public network (e.g., the Internet) via network adapter 120. As depicted, network adapter 120 communicates with the other components of computer system 112 via bus 118. It should be understood that although not shown, other hardware and/or software components could be used in conjunction with computer system 112. Examples, include, but are not limited to: microcode, device drivers, redundant processing units, external disk drive arrays, RAID systems, tape drives, and data archival storage systems, etc.

Figure 6:
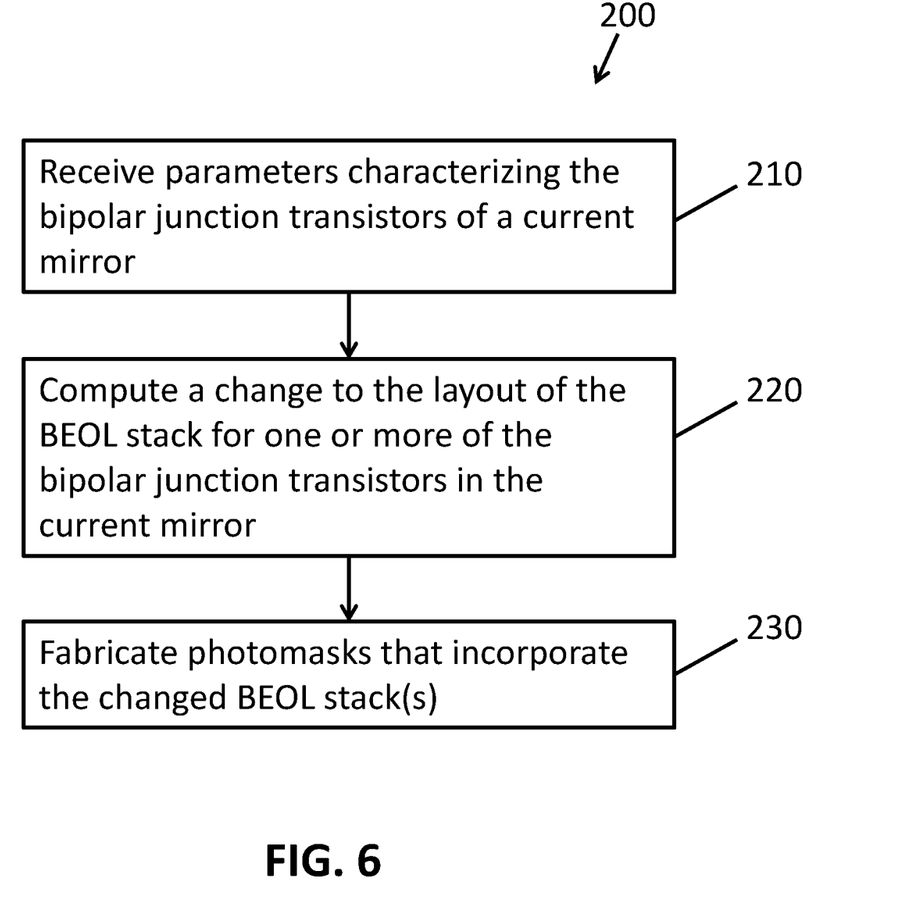
FIG. 6 is a flow chart detailing a method of determining a BEOL layout for a bipolar junction transistor to tune the current ratio of a current mirror in accordance with embodiments of the invention.

FIG. 6 provides a flowchart 200 that illustrates a sequence of operations that may be performed by the computer system 112 to tune the current ratio of a current mirror by changing the BEOL stack of one or more constituent bipolar junction transistors with no change to the FEOL layout of the one or more constituent bipolar junction transistors for which the BEOL stack is changed. The ability to predict a current ratio may be hampered because of an inability to adequately model the stresses and their sources. For this reason, the ability to tune the current ratio through changes made to the BEOL stack, without changing the FEOL layout, may be beneficial.

In block 210, parameters characterizing a current mirror and the bipolar junction transistors constituting the current mirror are received at the computer system 112. In particular, the computer system 112 may receive a current ratio, a desired collector current (Ic) at a specified DC bias voltage and/or a current gain given by a ratio between the collector current and a base current at the specified DC bias voltage for the different bipolar junction transistors, and parameters characterizing the bipolar junction transistors. The parameters may include, for each of the bipolar transistors, the FEOL layout, the dimensions of the active device region (i.e., the active area), and the layout of the BEOL stack for each of the bipolar junction transistors.

The layout of the BEOL stack represents the data used to fabricate photomasks that are in turn used to manufacture the BEOL stack respectively associated with each of the bipolar junction transistors. The FEOL layout of each bipolar junction transistor represents the data used to fabricate photomasks that are in turn used to manufacture each of the bipolar junction transistors. The active area of the active device region (RX) provides an indication of the stress applied by the shallow trench isolation to the intrinsic device region. The photomasks may be fabricated on a mask blank by creating a pattern of features in an opaque material on the mask blank. Typically, an electron beam writer creates an image of the pattern in a resist mask and the pattern is then transferred to a layer of the opaque material by etching with the mask in place. The features in the pattern are used to pattern a layer of material in connection with the fabrication of the BEOL stack.

In block 220, the computer system 112 may compute a change to the layout of the BEOL stack for one or more of the bipolar junction transistors in the current mirror that will result in a calculated collector current for each bipolar junction transistor with a modified BEOL stack and a calculated current ratio for the current mirror that are different than the received collector current and current ratio. The calculation is based on the parameters that are received as input, as well as predicted or measured data for collector currents. The measured collector current data may be actual data that is collected from fabricated devices, such as kerf devices. The predicted collector current data may derived through macro-modeling that applies a set of equations able to reproduce the behavior of a bipolar junction transistor in order to compute collector current data. The change to the layout of the BEOL stack may include the addition or subtraction of metal wires in one or more metal levels of the BEOL stack that overlie the first metal layer of the BEOL stack.

The calculated current ratio can be made less than, equal to or greater than an ideal current ratio depending on the layout of the BEOL stack. The collector current(s) and the current ratio may be changed in a direction to more closely match desired values.

In block 230, one or more photomasks may be fabricated that incorporates adjustments to the layout for the BEOL stacks.

The following examples are presented to illustrate the principles involved in the stress-induced adjustment to the collector current of a bipolar junction transistor and to the stress-induced adjustment to the collector ratio of a current mirror that is related to the collector current adjustment.

Table 1 shows the collector current measured under specified DC voltage bias conditions, namely a base-emitter bias of 0.72 volts, for a number of bipolar junction transistors formed as kerf devices on wafers. The designation 0.8×20×3 indicates that the bipolar junction transistor subject to the collector current measurement included 3 emitter fingers each 20 micrometers in length and 0.8 micrometers in width, which provides a total emitter area of 48 $\mu m^2$. The designation 0.8×10×1 indicates that the bipolar junction transistor subject to the collector current measurement included 1 emitter finger that was 10 micrometers in length and 0.8 micrometers in width, which provides a total emitter area of 8 $\mu m^2$. The ratio of emitter areas is (48 $\mu m^2$/8 $\mu m^2$)=6, which represents the ideal current ratio.

The bipolar junction transistors of each different emitter configuration were characterized by the same size and performance characteristics, but differed in the BEOL stack connected with the emitter. In the column of Table 1 labeled "Wireout", a designation of "M1" indicates that only the first wiring level was located over the emitter and the intrinsic device region, and a designation of "M1/M2" indicates that the first wiring level (M1) and a second wiring level (M2) were located over the emitter and the intrinsic device region.

As apparent from Table 1, the collector current (Ic) varies for the two different transistors as a function of the number of overlying wiring levels. For a current mirror in which the transistor with the 0.8×10×1 emitter configuration represents the reference transistor and the transistor with the 0.8×20×3 emitter configuration represents the mirrored transistor, the current ratio (Ic ratio) can adjusted to range from 4.83 to 5.54 on the same wafer through a modification to the wiring in the BEOL stack and without changing the FEOL layout of the bipolar junction transistors. This range for the current ratio can be extended through the addition of higher level metals above M2, which would operate to increase the applied stress.

TABLE 1

| Emitter Area ($A_E$) | Wireout | Ic (×10$^{-6}$ A) at VBE = 0.72 V | Ic ratio - wireout at M1 for the 0.8 × 10 × 1 transistor | Ic ratio - wireout at M2 for the 0.8 × 10 × 1 transistor |
|---|---|---|---|---|
| 0.8 × 20 × 3 | M1 | 178.6 | 5.33 (178.6/33.5) | 4.83 (178.6/37) |
| 0.8 × 20 × 3 | M1/M2 | 185.5 | 5.54 (185.5/33.5) | 5.01 (185.5/37) |
| 0.8 × 10 × 1 | M1 | 33.5 | | |
| 0.8 × 10 × 1 | M1/M2 | 37 | | |

Table 2 shows the collector current measured under specified DC voltage bias conditions, namely a base-emitter bias of 0.72 volts, for a number of bipolar junction transistors formed as kerf devices on wafers. The designation 1×24×2 indicates that the bipolar junction transistors subject to measurement included 2 emitter fingers each 24 micrometers in length and 1 micrometer in width, which provides a total emitter area of 48 $\mu m^2$. Median values of the collector are included in Table 2 and reflect chip-to-chip variation among measurements made on a number of chips from the same wafer.

The bipolar junction transistors differed in the BEOL stack connected with the emitter. In the column of Table 1 labeled "BEOL Stack", a designation of "M1" indicates that only the first wiring level was located over the emitter and the intrinsic device region, a designation of "M1/M2" indicates that the first wiring level (M1) and a second wiring level (M2) were located over the emitter and the intrinsic device region, and a designation of "M1/M2/M3" indicates that three wiring levels were located over the emitter and the intrinsic device region with the wiring level (M3) representing a third wiring level above the second wiring level (M2). In each instance with the exception of the bottom row, the wireout of the BEOL stack was the uppermost wiring level. In the bottom row, the upper two wiring levels were dummy wiring levels not connected with the transistor.

As apparent from the data in Table 1, the collector current (Ic) is observed to vary with the number of overlying wiring levels. The variation in collector current indicates that the current ratio of a current mirror can be changed through the selection of the BEOL stack over the emitter and intrinsic device region for one or more of the bipolar junction transistors constituting the current mirror, and that dummy wiring levels may impart a similar effect on the current ratio.

TABLE 2

| Emitter Area ($A_E$) | BEOL Stack | Wireout | Ic ($\times 10^{-6}$ A) at VBE = 0.72 V (median value) |
|---|---|---|---|
| 1 × 24 × 2 | M1 | M1 | 159 |
| 1 × 24 × 2 | M1/M2 | M2 | 165 |
| 1 × 24 × 2 | M1/M2/M3 | M3 | 173 |
| 1 × 24 × 2 | M1/M2/M3 | M1 | 167 |

A parameterized cell (PCell) with electronic design automation software based on the layout parameters for the current mirror. The PCell may be geometrically scaled to provide different values for the current ratio for bipolar junction transistors having the same emitter area ratio. As a result, in a given circuit design, different instances of the same PCell may be generated as IP blocks that have different user-defined values of current ratio for a current mirror.

The methods as described above may be used in the fabrication of integrated circuit chips. The resulting integrated circuit chips can be distributed by the fabricator in raw wafer form (e.g., as a single wafer that has multiple unpackaged chips), as a bare die, or in a packaged form. In the latter case, the chip is mounted in a single chip package (e.g., a plastic carrier, with leads that are affixed to a motherboard or other higher level carrier) or in a multichip package (e.g., a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

A feature may be "connected" or "coupled" to or with another element may be directly connected or coupled to the other element or, instead, one or more intervening elements may be present. A feature may be "directly connected" or "directly coupled" to another element if intervening elements are absent. A feature may be "indirectly connected" or "indirectly coupled" to another element if at least one intervening element is present.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
receiving, by one or more processors, a first layout for a first back-end-of-line (BEOL) stack that is coupled with an emitter of a first bipolar junction transistor in a first current mirror that has a first current ratio;
determining, by the one or more processors, a second layout for a second back-end-of-line (BEOL) stack that differs from the first layout for the first BEOL stack such that, when the second BEOL stack is coupled with the emitter of the first bipolar junction transistor, the first current ratio is tuned to a second current ratio based on the change from the first layout for the first BEOL stack to the second layout for the second BEOL stack without changing a first front-end-of-line (FEOL) layout of the first bipolar junction transistor;
fabricating one or more photomasks based on the second layout of the second BEOL stack; and
fabricating the second BEOL stack using the one or more photomasks.

2. A method comprising:
receiving, by one or more processors, a first layout for a first back-end-of-line (BEOL) stack that is coupled with an emitter of a first bipolar junction transistor in a first current mirror that has a first current ratio;
determining, by the one or more processors, a second layout for a second back-end-of-line (BEOL) stack that differs from the first layout for the first BEOL stack such that, when the second BEOL stack is coupled with the emitter of the first bipolar junction transistor, the first current ratio is changed to a second current ratio based on the change from the first layout for the first BEOL stack to the second layout for the second BEOL stack without changing a first front-end-of-line (FEOL) layout of the first bipolar junction transistor;
fabricating a device structure for the first bipolar junction transistor using the first FEOL layout of the first bipolar junction transistor; and
after fabricating the device structure for the first bipolar junction transistor, fabricating the second BEOL stack with the second layout,
wherein the second BEOL stack includes one or more wiring levels arranged over the device structure for the first bipolar junction transistor, the one or more wiring levels include a first wire and a first contact coupling the first wire with the emitter of the first bipolar junction transistor, and the second layout of the second BEOL stack is selected to tune stress transferred from the one or more wiring levels to the device structure for the first bipolar junction transistor.

3. The method of claim 2 wherein the first bipolar junction transistor is a reference transistor of the first current mirror.

4. The method of claim 2 wherein the first bipolar junction transistor is a mirrored transistor of the first current mirror.

5. The method of claim 2 further comprising:
fabricating one or more photomasks based on the second layout of the second BEOL stack.

6. The method of claim 5 wherein the second BEOL stack is fabricated over the first bipolar junction transistor using the one or more photomasks.

7. The method of claim 2 wherein the second current ratio is less than an ideal current ratio.

8. The method of claim 2 wherein the second current ratio is greater than or equal to an ideal current ratio.

9. The method of claim 2 wherein the first current mirror includes a second bipolar junction transistor with a second front-end-of-line (FEOL) layout, the second BEOL stack and further comprising:

fabricating a device structure for the first bipolar junction transistor using the first FEOL layout of the first bipolar junction transistor, wherein the first current ratio is changed to the second current ratio without changing the second FEOL layout of the second bipolar junction transistor, the one or more wiring levels include a second wire and a second contact coupling the second wire with the emitter of the second bipolar junction transistor, and the second layout of the second BEOL stack is selected to tune stress transferred from the one or more wiring levels to the device structure for the second bipolar junction transistor.

10. The method of claim 9 wherein the first bipolar junction transistor is a reference transistor of the first current mirror, and the second bipolar junction transistor is a mirrored transistor of the first current mirror.

11. The method of claim 9 wherein the first bipolar junction transistor and the second bipolar junction transistor are mirrored transistors of the first current mirror.

12. The method of claim 9 wherein the second FEOL layout of the second bipolar junction transistor is identical to the first FEOL layout of the first bipolar junction transistor.

13. The method of claim 2 wherein the first current mirror has an emitter area ratio, and the first BEOL stack belongs to a parameterized cell that is scaled to provide the second BEOL stack for a second current mirror having the second current ratio and an emitter area ratio equal to the emitter area ratio of the first current mirror.

14. The method of claim 2 wherein determining, by the one or more processors, the second layout for the second BEOL stack that differs from the first layout for the first BEOL stack comprises:

receiving, at the one or more processors, a plurality of parameters including active region dimensions for the first bipolar junction transistor, the first FEOL layout for the first bipolar junction transistor, and the first layout for the first BEOL stack;

receiving, at the one or more processors, predicted data for a collector current at a given base-emitter bias of the first bipolar junction transistor; and calculating, by the one or more processors, the second layout for the second BEOL stack based on the parameters and the predicted data such that the collector current for the first bipolar junction transistor is changed to provide the second current ratio.

15. The method of claim 14 wherein the collector current is increased to provide the second current ratio.

16. The method of claim 2 wherein determining, by the one or more processors, the second layout for the second BEOL stack that differs from the first layout for the first BEOL stack comprises:

receiving, at the one or more processors, a plurality of parameters including active region dimensions for the first bipolar junction transistor, the first FEOL layout for the first bipolar junction transistor, and the first layout for the first BEOL stack;

receiving, at the one or more processors, measured data for a collector current at a given base-emitter bias of the first bipolar junction transistor; and calculating, by the one or more processors, the second layout for the second BEOL stack based on the parameters and the measured data such that the collector current for the first bipolar junction transistor is changed to provide the second current ratio.

17. The method of claim 16 wherein the collector current of the first bipolar junction transistor is increased by the second layout for the second BEOL stack to provide the second current ratio.

* * * * *